United States Patent [19]

Platts

[11] Patent Number: 5,165,960

[45] Date of Patent: Nov. 24, 1992

[54] DEPOSITION OF MAGNESIUM FLUORIDE FILMS

[75] Inventor: Dennis R. Platts, Livonia, Mich.

[73] Assignee: Ford Motor Company, Dearborn, Mich.

[21] Appl. No.: 736,863

[22] Filed: Jul. 29, 1991

[51] Int. Cl.$^5$ ............................................. B05D 5/06
[52] U.S. Cl. .................................... 427/166; 427/165; 427/168; 427/226; 427/255; 427/255.2; 427/314; 427/421
[58] Field of Search ............... 427/226, 166, 165, 168, 427/314, 421, 255.2, 255; 106/582

[56] References Cited

U.S. PATENT DOCUMENTS

| | | | |
|---|---|---|---|
| 2,617,745 | 11/1952 | Raymond et al. | 427/108 |
| 3,475,192 | 10/1969 | Langley | 427/226 |
| 4,492,721 | 1/1985 | Joosten et al. | 427/226 |
| 5,051,278 | 9/1991 | Paz-Pujalt | 427/126.2 |

Primary Examiner—Janyce Bell
Attorney, Agent, or Firm—Charles H. Ellerbrock; Clifford L. Sadler

[57] ABSTRACT

A reactive precursor, for depositing a magnesium fluoride film on glass by a spray pyrolysis or chemical vapor deposition process, comprises magnesium acetylacetonate, trifluoroacetic acid, and optionally a solvent.

9 Claims, No Drawings

DEPOSITION OF MAGNESIUM FLUORIDE FILMS

FIELD OF THE INVENTION

This invention relates generally to the deposition of magnesium fluoride films onto glass. More particularly, the invention is directed to a process for depositing, by spray pyrolysis or chemical vapor deposition, magnesium fluoride films onto the surface of a hot glass substrate, such as is produced by the float-glass process.

BACKGROUND OF THE INVENTION

Magnesium fluoride is well-known as a coating material which imparts anti-reflectivity to optical articles and vision glazings, to increase the visible light transmissivity of same. Magnesium fluoride films may conveniently be deposited onto transparent substrates, either singularly or in combination with other metal and dielectric layers, by conventional methods such as, for example, spray pyrolysis, chemical vapor deposition, vacuum evaporation, sputtering, and the like.

The deposition of magnesium fluoride by spray pyrolysis or chemical vapor deposition requires the preparation of a proper reactive precursor which is then directed onto the heated surface of the substrate to be coated. Spray pyrolysis utilizes a liquid reactive precursor which is sprayed onto the surface of the hot substrate whereat the precursor thermally decomposes and reacts to form a film. Chemical vapor deposition utilizes a gaseous reactive precursor which is delivered to the surface of the hot substrate whereat the precursor reacts to form the film. Conveniently, a continuous glass ribbon being produced by the float glass process possess sufficient heat to activate and react both spray pyrolysis and chemical vapor deposition precursors to form such films thereon.

U.S. Pat. No. 3,475,192 to Langley discloses a liquid reactive precursor which is coated onto a glass surface then fired to form a magnesium fluoride film. The precursor comprises magnesium fluoride dissolved in a mixture of an organic solvent and a film forming material, e.g., an oil.

U.S. Pat. No. 4,492,721 to Joosten et al. discloses a method of providing magnesium fluoride layers on substrates by the disproportionation of fluorine-containing organic magnesium compounds containing at least six fluorine atoms per magnesium atom. A reactive precursor, comprising a fluorine-containing compound, e.g., magnesium trifluoroacetate, magnesium trifluoroacetylacetonate, magnesium hexafluoroacetylacetonate, etc., and an organic solvent is contacted with a hot glass substrate utilizing either spray pyrolysis or chemical vapor deposition, depending upon the vaporization temperature of the fluorine-containing compound used. Such precursors, however, are generally difficult to work with due to their limited solubility in various solvents, and additionally produce coatings on glass having relatively limited anti-reflection properties.

It would be desirable to devise a process for depositing highly anti-reflective magnesium fluoride coatings on glass, utilizing reactive precursors which are easy to work with due to their good solubility properties.

SUMMARY OF THE INVENTION

Accordant with the present invention, a reactive precursor for preparing a magnesium fluoride film on glass by a spray pyrolysis or chemical vapor deposition process has surprisingly been discovered. The precursor comprises:
A) magnesium acetylacetonate;
B) trifluoroacetic acid; and
C) optionally, a solvent.

The inventive reactive precursor may be delivered to the surface of a heated glass substrate as either a liquid (in the spray pyrolysis process) or as a vapor (in the chemical vapor deposition process).

The reactive precursors of the present invention are particularly well suited for placing magnesium fluoride anti-reflective films onto automotive and architectural glazings.

DETAILED DESCRIPTION OF THE PREFERRED EMBODIMENT

A magnesium fluoride film is deposited onto a hot glass substrate by either of the well-known pyrolysis or chemical vapor deposition processes, utilizing a reactive precursor comprising a mixture of magnesium acetylacetonate and trifluoroacetic acid. Conveniently, the reactive precursor may also include a solvent. The magnesium fluoride film deposited by the process of the present invention additionally contains a minor amount of magnesium oxide which decreases as the reaction temperature increases.

The glass upon which the magnesium fluoride film is deposited may be in the form of individual glass sheets, or in the form of a continuous glass ribbon produced by the well-known float glass process. Suitable glass substrates for use according to the present invention may include any of the conventional glass compositions known in the art as useful for preparing automotive or architectural glazings. The various chemical compositions which produce different glass substrates, e.g., borosilicate glass or soda-lime-silica glass, generally do not structurally nor chemically affect the deposited layer of magnesium fluoride. A preferred glass is commonly known in the art as soda-lime-silica glass, and may be of any thickness generally known as useful for providing support for a coating such as magnesium fluoride.

Where the glass to be coated with magnesium fluoride is being produced by the float glass process, the temperature of the glass is already sufficiently high to either pyrolyze the liquid spray or react together the vaporized components of the chemical vapor deposition reactive precursors of the present invention. Pyrolysis or chemical vapor deposition utilizing the inventive reactive precursors generally is carried out at a temperature from about 900° F. to about 1,200° F. Individual glass sheets which are to receive a coating of magnesium fluoride must be heated to approximately this specified temperature range to effect the pyrolysis or chemical vapor deposition reaction.

Magnesium acetylacetonate is a well-known, commercially available chemical reagent which may be obtained from Amspec, Gloucester City, N.J. Trifluoroacetic acid likewise is a well-known commercially available chemical reagent, generally available in concentrations from about 97% to about 98.5%, from suppliers such as Fisher Scientific, Pittsburgh, Pa.

Solvents which may optionally be included in the reactive precursors of the present invention include a wide variety of organic materials such as, for example, methanol, dimethylformamide, benzene, toluene, xylene, hexane, heptane, methanol, ethanol, methylene chloride, perchloroethylene, chloroform, carbon tetrachloride, dimethylacetamide, acetonitrile, nitrobenzene, acetic acid, ethylene diamine, propanol, butanol, etc., and water, as well as mixtures thereof. A preferred solvent is a mixture of methanol and water.

The ingredients may be admixed in any conventional mixing device, and in any order. Generally, the solvent, if one is used, is mixed with the trifluoroacetic acid, and the magnesium acetylacetonate is thereafter added to the mixture. The magnesium acetylacetonate and trifluoroacetic acid are present in amounts sufficient to produce a magnesium fluoride film on the surface of a hot glass substrate, utilizing either a spray pyrolysis or chemical vapor deposition process. Generally, the magnesium acetylacetonate is present in a concentration from about 4% to about 20% by weight of the reactive precursor. Preferably, the concentration of magnesium acetylacetonate is from about 10% to about 18% by weight. The trifluoroacetic acid is generally present in a concentration from about 5% to about 95% by weight of the reactive precursor. Preferably, the concentration of trifluoroacetic acid is from about 8% to about 14% by weight, and is used in conjunction with a solvent. The solvent, when optionally present, is generally included at a concentration from about 60% to about 80% by weight of the reactive precursor. A preferred reactive precursor includes a solvent at a concentration from about 70% to about 80% by weight. The reactive precursor is delivered to the surface of the heated glass substrate as a liquid in a spray pyrolysis process. However, the reactive precursor is vaporized by conventional means to form a vapor which is then delivered to the heated surface of the glass substrate in a chemical vapor deposition process.

The resultant magnesium fluoride film may be deposited so as to form a layer having virtually any thickness, depending upon the reaction time, reaction conditions, glass temperature, etc. Generally, film thicknesses from about 50 Angstroms to about 5,000 Angstroms have been found to be useful for various automotive and architectural glazing applications, depending on the intended purpose for the magnesium fluoride film.

The inventive process is not only useful for forming a magnesium fluoride film directly on a glass surface, but also for forming a magnesium fluoride film on a previously deposited coating which is adhered to the glass surface. Thus, the present invention may be used to apply a magnesium fluoride film over a previously applied dielectric or metal layer. Accordingly, the term "glass substrate" as used herein is intended to include glass having one or more of the aforementioned dielectric or metal layers adhered thereto. Examples of dielectric layers upon which a magnesium fluoride film may be deposited according to the present invention include, but are not necessarily limited to, ZnO, $SnO_2$, $MgF_2$, $Al_2O_3$, TiN, $SiO_2$, MgO, $TiO_2$, and the like, as well as mixtures thereof. Contemplated metal layers having the same operability and utility upon which a magnesium fluoride film may be deposited include, but are not necessarily limited to, Ag, Au, Cu, Ti, Al, Sn, etc., as well as alloys thereof. It is well known, for example, to manufacture a high performance automotive or architectural glazing having anti-reflection, infrared rejection, and/or electrical resistance heatability properties, comprising a glass substrate having multiple coatings of silver and zinc oxide thereon, including a final anti-reflection coating of magnesium fluoride.

EXAMPLE

A reactive precursor is prepared by admixing 15.6 weight percent magnesium acetylacetonate, 8.9 weight percent trifluoroacetic acid, 30.3 weight percent water, and 45.1 weight percent methanol. The resulting reactive precursor solution is sprayed onto a soda-lime-silica glass sheet having a previously applied layer of fluorine-doped tin oxide, at a temperature of about 1,000° F., to produce a magnesium fluoride film, containing a minor amount of magnesium oxide, about 1,400 Angstroms thick.

The magnesium fluoride coated substrate has a film-side reflectance of 5.6%, compared to the film-side reflectance of the fluorine-doped tin oxide coated glass substrate equal to 9.4%.

Other examples may be prepared with similar success by substituting the generally or specifically described reactants and/or reaction conditions recited herein for those actually used in the preceeding example.

From the foregoing description, one skilled in the art can easily ascertain the essential characteristics of this invention, and without departing from its spirit and scope, can make various changes and modifications to adapt the invention to various usages and conditions.

What is claimed is:

1. A process for depositing a film of magnesium fluoride on a glass substrate, comprising;
   A) heating the glass substrate to a temperature of about 900° F. to 1200° F.; and
   B) delivering to a surface of the heated glass substrate a reactive precursor, comprising a mixture of magnesium acetylacetonate, trifluoroacetic acid, and optionally a solvent, sufficient to form a film of magnesium fluoride thereon.

2. The process for depositing a film of magnesium fluoride on a glass substrate according to claim 1, wherein the reactive precursor is delivered to the surface of the heated glass substrate in liquid form in a spray pyrolysis process.

3. The process for depositing a film of magnesium fluoride on a glass substrate according to claim 1, wherein the reactive precursor is delivered to the surface of the heated glass substrate in vapor form in a chemical vapor deposition process.

4. The process for depositing a film of magnesium fluoride on a glass substrate according to claim 1, wherein the magnesium acetylacetonate comprises from about 4% to about 20% by weight of the reactive precursor.

5. The process for depositing a film of magnesium fluoride on a glass substrate according to claim 1, wherein the trifluoroacetic acid comprises from about 5% to about 95% by weight of the reactive precursor.

6. The Process for depositing a film of magnesium fluoride on a glass substrate according to claim 1, wherein the the solvent comprises from about 60% to about 80% by weight of the reactive precursor.

7. A process for depositing a film of magnesium fluoride on a glass substrate, comprising:
   A) heating the glass substrate to a temperature from about 900° F. to about 1,200° F.; and
   B) delivering to a surface of the heated glass substrate a reactive precursor, comprising a mixture of about 10% to about 18% by weight magnesium acetylacetonate, about 8% to about 14% by weight trifluoroacetic acid, and about 70% to about 80% by weight solvent, sufficient to form a film of magnesium fluoride thereon.

8. The process for depositing a film of magnesium fluoride on a glass substrate according to claim 7, wherein the reactive precursor is delivered to the surface of the heated glass substrate in liquid form in a spray pyrolysis process.

9. The process for depositing a film of magnesium fluoride on a glass substrate according to claim 7, wherein the reactive precursor is delivered to the surface of the heated glass substrate in vapor form in a chemical vapor deposition process.

* * * * *